Dec. 25, 1956  G. P. HAMNER ET AL  2,775,575
PETROLEUM RESINS OF IMPROVED COLOR FROM 18°–85°C. STREAM
Filed May 20, 1953
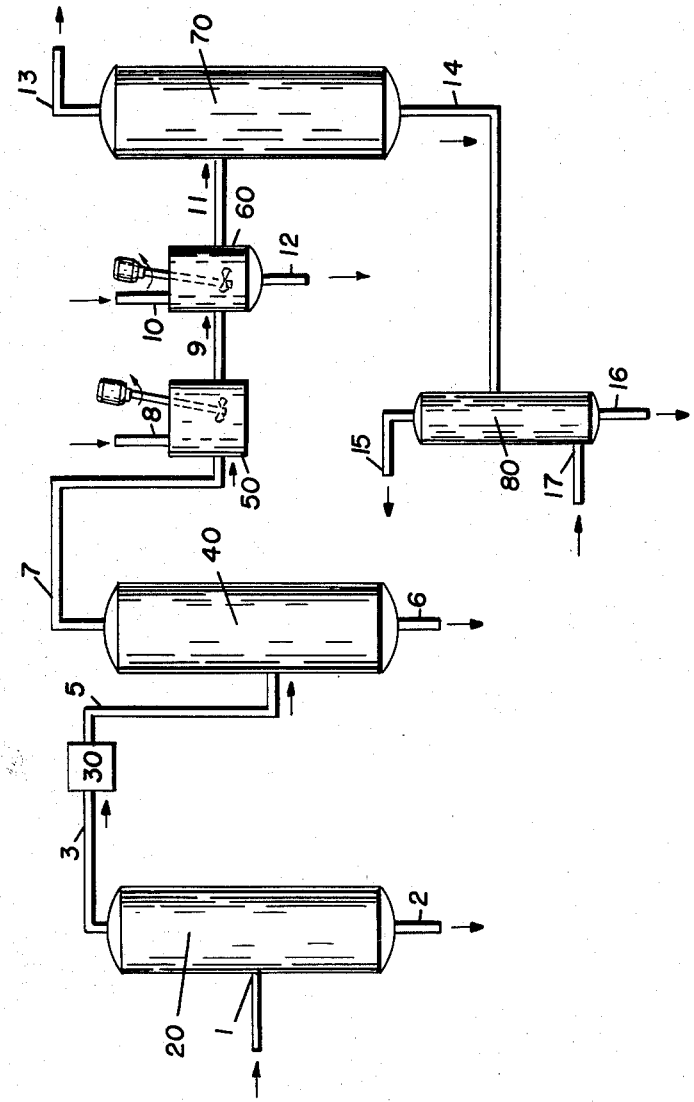
GLEN P. HAMNER
THOMAS G. JONES   INVENTORS
BY *W. H. Smyers*   ATTORNEY

United States Patent Office 2,775,575
Patented Dec. 25, 1956

2,775,575

PETROLEUM RESINS OF IMPROVED COLOR FROM 18°–85° C. STREAM

Glen P. Hamner and Thomas G. Jones, Baton Rouge, La., assignors to Esso Research and Engineering Company, a corporation of Delaware Application May 20, 1953, Serial No. 356,153

2 Claims. (Cl. 260—82)

This invention is broadly concerned with the preparation of resins and polymeric materials and specifically with the polymerization of selected steam cracked distillate streams from which higher boiling, color forming components have been removed.

In general, heavier petroleum fractions such as heavy naphtha, kerosene, gas oil, and the like, are cracked at relatively low pressures and at temperatures of 1000 to 1600° F. in the presence of steam and for relatively short contact times. The gas and liquid streams produced contain large quantities of diolefins and olefins in the $C_5$ to $C_{10}$ range. The naphtha distillate streams obtained by these steam cracking operations contain relatively large amounts of diolefins, olefins, aromatics, and some paraffins. Petroleum resins produced from these cracked naphthas by polymerization with Friedel-Crafts catalysts are normally dark yellow to red in color.

The process of this invention is concerned with the selection and polymerization of a $C_5$–$C_7$ fraction of specific boiling range and composition from which substantially all the components boiling above 85° C. have been previously removed.

A resin of unusually good color having a high softening point may be made by $AlCl_3$ treating a steam cracked naphtha that has been prefractionated to remove all material heavier than benzene, 85° C.+. Such a distillation removes all diolefins heavier than $C_6$ thus removing the heavier diolefins and the least active $C_7$ olefins prior to polymerization with $AlCl_3$ catalyst. The desired fraction for polymerization has a boiling range of about 18° to 85° C. This fraction contains approximately 40 to 50% $C_5$, 30 to 35% $C_6$ and <5% $C_7$ olefins and diolefins. The $C_5$ fraction has 30% isoprene and piperylene and 65% olefins. The $C_6$ fraction contains 45% benzene, 15–20% diolefins and 35% olefins.

The feed may be partially depentanized prior to polymerization if the isoprene present is desired for extraction. The 18 to 38° C. fraction obtained as raffinate from the isoprene extraction may be recycled back to the resin feed stream if so desired. The resin may be modified by the addition of diolefin monomers, dimers, co-dimers or heavier tetramers, such as $C_4$, $C_5$ and $C_6$ cyclic or acyclic diolefins. The unreacted naphtha stream remaining after the polymerization may be fed directly to an extraction process for the recovery of benzene since all 85° C.+ fraction has been removed prior to polymerization.

The polymerization of the selected feed is carried out using a Friedel-Crafts catalyst such as aluminum chloride, aluminum bromide, boron fluoride, zirconium, tetrachloride, Friedel-Crafts complexes, and the like as the polymerization catalyst at temperatures in the range of 0° to +150° F. The liquid material undergoing reaction should be well agitated to insure adequate saturation of the liquid with gas. About 0.5 to 2% catalyst based on the feed charged is usually quite satisfactory.

The polymerization reaction is carried out as a liquid phase operation. The catalyst may be added continually or batchwise. Any practical and effective methods for adding catalyst and reagents can be utilized.

The time required to carry out the polymerization depends primarily on the rate at which the catalyst can be added such that the reaction can be adequately controlled. The products are worked up by water or caustic washing or by washing with dilute $H_2SO_4$ (5%) followed by water washing. The catalyst residues can also be removed by the addition of alcohol (isopropyl) followed by water washings. The polymerized resin is then stripped free of unreacted feed components and any of the low molecular weight polymerization products to give the final resin. The exact yield and softening point of the final product will depend on the degree of stripping.

The light colored resins so produced can be used as a base for paint, varnish manufacture, or formulated in printing ink. The resin has an excellent color and odor and is completely miscible in a naphtha solvent.

*Example 1*

This example is best understood if it is read in conjunction with the accompanying figure showing a schematic outline of the invention.

Stream 1 is a cracked naphtha containing olefins, diolefins and aromatics in the $C_5$ through $C_{12}$ boiling range (18° to 230° C.). The $C_5$ fraction contains 20–30% cyclic and acyclic diolefins, 20–30% tertiary olefins, and 40 to 50% normal olefins. The higher boiling fractions have the approximately same ratio of olefins and diolefins but contain approximately 40% aromatics. Stream 1 is fed to tower 20 having about 30 plates. In tower 20, the 85° C. and lighter fraction is taken overhead as stream 3 and the 85° C.+ fraction removed from the tower 20 as stream 2. Stream 3 is thermally soaked in vessel 30 for 6–16 hours at 220° F. to dimerize the cyclic diolefins. The dimerized stream 5 is then fed to tower 40 having 30 plates where the naphtha free of the dimers is taken overhead as stream 7 and the dimers removed as a bottoms stream 6. The 85° C. and lighter fraction is fed to reactor 50 where $AlCl_3$ catalyst is added by line 8. The 18–85° C. fraction is then polymerizd with 0.2 to 2 weight percent $AlCl_3$ based on feed charged, for 15 to 60 minutes at 20 to 50° C. The polymerizate line 9 is then injected into vessel 60 where water and caustic is injected by line 10 to neutralize the residual $AlCl_3$ catalyst. The catalyst-water solution is removed by line 12 and the naphtha plus resin line 11 is fed to tower 70 having 30 plates. Stream 13 (18–85° C.) is removed overhead and the resin concentrate is removed as bottoms stream 14. The resin concentrate may be diluted with a solvent at this point or be fed to tower 80 where the resin is steam stripped to a 90° C. softening point resin of very light color. Resin is recovered from line 16. The low molecular weight polymers are removed overhead as line 15 and steam is injected through line 17.

*Example 2*

A $C_5$–$C_7$ steam cracked fraction boiling up to 85° C. and substantially free of cyclodienes was polymerized with 1 weight percent of $AlCl_3$ at 80 to 100° F. for 30 minutes to yield 33.6 weight percent resin. The following inspections were obtained on the petroleum resin formed:

Color, Gardner dil.[1] _____ <1
Color, Gardner dil.[2] _____ 1+
Softening point, ° C. _____ 84
Aniline point, ° C. _____ 137
Iodine number, cg./g. (ASTM) _____ 182

[1] 1 gram of resin diluted with 67 ml. xylene.
[2] 10 grams of resin diluted with 67 ml. xylene.

Since the color was <1 on the color standard normally used for evaluating petroleum resins, the resin concentration was increased 10 fold before exceeding a color of 1 on the scale. Feed stock containing naphtha boiling higher than 85° C. normally gives resins having color of >3 when diluted 1 gram/67 ml. xylene.

What is claimed is:

1. In a process for the preparation of improved petroleum resins the combination which comprises isolating a steam cracked hydrocarbon petroleum fraction boiling between about more than 18° C. to less than 85° C., heating the steam cracked fraction to a temperature sufficient to dimerize substantially all cyclodienes, stripping the resulting admixture to a temperature sufficient to separate an overhead product from the dimerized cyclodienes, recovering as the overhead product a stream boiling between about more than 18° C. to less than 85° C. and having the following composition:

| | Weight percent |
|---|---|
| Benzene | 13.5–15.75 |
| $C_5$–$C_6$ diolefins | 16.5–22.0 |
| $C_5$–$C_6$ olefins | 36.5–43.25 |
| $C_7$ diolefins and olefins | Less than 5 | said composition being substantially free of cyclodienes, and polymerizing the stream in the presence of a Friedel-Crafts catalyst at a temperature of about −18° C. to +66° C. and recovering the resin formed thereby.

2. In a process for the preparation of improved petroleum resins, the combination which comprises isolating a steam cracked petroleum fraction boiling between about 18° C. and 85° C., heating the fraction to a temperature of about 104° C., whereby to dimerize substantially all the cyclodienes, stripping the resulting admixture to a temperature of not more than about 85° C. but sufficient to separate an overhead product from the cyclodienes, recovering as the overhead product a stream boiling between about more than 18° C. to less than 85° C. and having the following composition:

| | Weight percent |
|---|---|
| Benzene | 13.5–15.75 |
| $C_5$–$C_6$ diolefins | 16.5–22.0 |
| $C_5$–$C_6$ olefins | 36.5–43.25 |
| $C_7$ diolefins and olefins | Less than 5 | said stream being substantially free from cyclodienes, and polymerizing the stream in the presence of an aluminum chloride catalyst at a temperature between about −18 and +66° C. and recovering the resin formed thereby.

References Cited in the file of this patent

UNITED STATES PATENTS

| 1,836,629 | Thomas | Dec. 15, 1931 |
| 1,982,707 | Thomas | Dec. 4, 1934 |
| 1,982,708 | Thomas | Dec. 4, 1934 |
| 2,234,660 | Thomas | Mar. 11, 1941 |
| 2,349,418 | Glowacki | May 23, 1944 |
| 2,500,755 | Jones | Mar. 14, 1950 |
| 2,734,046 | Nelson et al. | Feb. 7, 1956 |

OTHER REFERENCES

Thomas et al.: Ind. Eng. Chem., 24, 1125–1128 (1932).
Fulton et al.: Ind. Eng. Chem., 32, 304–309 (1940).